United States Patent [19]

Kamm et al.

[11] 3,904,822

[45] Sept. 9, 1975

[54] ABSOLUTE POSITION DETERMINING SYSTEM USING FREE STYLUS

[75] Inventors: Vernon C. Kamm, Farmington Hills; John T. Ioannou, Livonia; James L. Faxon, Oak Park, all of Mich.

[73] Assignee: The Bendix Corporation, Southfield, Mich.

[22] Filed: Mar. 21, 1974

[21] Appl. No.: 453,659

[52] U.S. Cl. .............................................. 178/19

[51] Int. Cl. ........................................... G08c 21/00

[58] Field of Search ............ 340/347 AD, 146.3 SY; 178/18, 19, 20, 87; 346/139 C

[56] References Cited

UNITED STATES PATENTS 3,700,809 10/1972 Nadon ................................ 178/18

3,732,369 5/1973 Cotter ................................ 178/18

*Primary Examiner*—Thomas A. Robinson

*Attorney, Agent, or Firm*—Lester L. Hallacher

[57] ABSTRACT

A system for digitizing and recording graphic data such as lines and curves from a work sheet by tracing the data with a pen-like stylus. Orthogonal conductor grids in a tablet over which the work sheet is placed are energized with time spaced current pulses. An impulse train is generated by a coil mounted in the stylus. When the stylus impulse envelope passes through a threshold value between two opposite polarity peaks, a strobe pulse is generated to sample a reference counter. The count is a digital indication of stylus end point position and is substantially insensitive to stylus tilt.

14 Claims, 8 Drawing Figures

ABSOLUTE POSITION DETERMINING SYSTEM USING FREE STYLUS

INTRODUCTION

This invention relates to a system for precisely determining the position of a stylus on a two-dimensional work surface and more particularly to a system for producing absolute stylus position coordinate data in digital form and in such a fashion as to be substantially insensitive to stylus tilt; i,e., angular displacement of the stylus away from orthogonality with the plane of the work surface.

BACKGROUND OF THE INVENTION

Systems for recording points and curves on a work sheet by monitoring the position of a pointer or similar movable device on a work surface are known in the prior art and, in general, comprise (a) a rigid structure defining a two-dimensional work sheet support surface, such structure being commonly called a "tablet," and (b) a pointer device which is positionable over and in contact with a work sheet on the surface. The system further typically comprises a conductor grid in the work surface structure and some instrumentality to provide an electrical coupling between the conductor grid and the pointer so that contacting the surface structure with the pointer transfers an electrical signal quantity between the pointer and grid. From this signal quantity, the particular position of the pointer within the grid is determined using one of several available techniques. Thus, an operator may place a drawing or the like on the work surface and generate and store data representing points or lines on the drawing simply by tracing out the points or lines with the pointer.

Although prior art systems vary considerably in implementation, at least some of the known systems produce position data on an incremental basis; i.e., the current position data from the pointer is meaningful only as related to its last-mentioned position. Accordingly, a complete loss of relative position information does occur whenever the electrical link between the pointer and the grid is broken in the course of a tracing or digitizing operation. On the other hand, an absolute measuring system incorporates an inherent reference and no loss of the reference occurs should the stylus be withdrawn or lifted from the tablet in the course of a measurement operation.

The pointer can take a variety of forms. In one form, the pointer is constructed to exhibit a flat bottom surface which is adapted to rest on the plane surface of the tablet. This construction ensures a uniform angular relationship between the pointer structure and the tablet at all times and in all positions. This type of pointer is usually called a "cursor." Other pointers are of the "free" type, i.e., are hand-held, and include a body which is similar to a ball point pen or pencil. This kind of a pointer is usually called a "stylus." Accordingly, it is possible for the operator to move the stylus through a wide range of angular orientations relative to the plane of the tablet. In many prior art systems stylus tilt or angular displacement from the orthogonal position relative to the tablet is a substantial source of error in the measurement data. Notwithstanding the tilt error and other problems with prior art pen-type styli the advantages of a free, pen-type stylus make it highly attractive particularly in an absolute measurement system.

BRIEF DESCRIPTION OF THE PRESENT INVENTION

The present invention has for its principal objective the provision of a position measuring system having a tablet and a free, pen or pencil type stylus wherein absolute position data is provided in digital form, wherein the stylus is essentially passive; i.e., does not couple an excitation signal into the conductor grid, and wherein the accuracy of the data is extremely high irrespective of stylus tilt over a broad range of angular positions. In general, this is accomplished by the provision of a tablet having, for each axis, a plurality of spaced, parallel conductors substantially coextensive with the work surface of the tablet, means for producing successive sequential pulse excitation of the conductors and means including a stylus pickup for producing a high resolution digital count representing the position of the stylus on the tablet as a function of the time of passage of a pulse wave through the position of the stylus end. As hereinafter explained, the stylus pickup comprises a coil which is disposed at a height "$h$" above the conductor plane measured along the stylus. Energization of the conductors in sequence produces a coil impulse voltage envelope which rises to a first peak which corresponds to the energization of the first conductor which lies within a distance $h$ from the stylus end taken along the grid plane. The envelope then passes through a polarity change to a second peak of opposite polarity as the last conductor a distance $h$ from the stylus end but on the other side thereof is excited. The position is determined by determining the time, measured from the beginning of the conductor excitation sequence, the envelope passes through a reference value, such as zero, between the two peaks.

In the preferred embodiment of the invention hereinafter described in greater detail, high position resolution in the digital position count is provided by means of the combination of a source of high frequency signals, a uniform number of which occur between successive lower frequency signals, means for applying the lower frequency signals to the tablet in such a way as to initiate the sequential pulse excitation of the conductors at least once for each such signal, counter means for keeping track of the number of high frequency signals, pickup means including a portion carried by the stylus for producing an output signal as the polarities of the pickup signal voltages reverse; i.e., the pickup signal amplitude passes between positive and negative peaks, and means connecting the output signal from the stylus to a register which receives a number proportional or equal to the number of high frequency signals which have occurred prior to the zero crossing. Accordingly, this number is a representation of the absolute position of the stylus on the work surface of the tablet. The count from the register is a digital indication of stylus position along one axis and is of such a character as to be readily converted to a suitable form for computer storage and/or display.

A still further feature of the present invention is the use of an inductive coil stylus pickup comprising a single coil the plane of which is substantially perpendicular to the longitudinal axis of a pen-type stylus body, thus, to eliminate system sensitivity to the angular position of the stylus about its own longitudinal axis. A still further advantage of the use of the single conductive coil and the associated signal forming circuitry hereinafter described is the substantial elimination of sensitivity to stylus tilt; i.e., nonorthogonality relative to the tablet plane. This is accomplished by generating the pickup output or "strobe" signal as a function of the occurrence of a particular voltage amplitude condition in the stylus coil between the positive and negative peaks. The time of this condition within a given signal interval is a function of the coordinates of the stylus end point on the tablet and is insensitive to the tilt or angle of the stylus relative to the tablet surface.

In one form, hereinafter described in greater detail, the signal forming circuitry mentioned above comprises what is essentially a filter for generating an analog representation of the composite impulse signal envelope and has a zero crossing which occurs upon the passage of the pulse wave at the stylus end point. This embodiment also comprises tablet conductor energizing means for producing excitation pulses which are of a time length equal to the time between successive conductor energizing pulses, hereinafter called "clock times." In another embodiment also described in detail hereinafter, the pulse or signal-forming circuitry comprises a sampling circuit for producing first and second signal voltages representing the amplitudes of the last pickup pulse of one polarity and the first pickup pulse of another polarity; i.e., the pulses on opposite sides of a zero amplitude condition. The circuit further comprises means for generating an output signal at an estimated zero-crossing time, which is determined as a function of a predetermined relationship between the amplitudes of the first and second polarity pulses.

Various additional features and advantages of the present invention will be apparent from the following detailed description of an illustrative embodiment of the invention. This description is to be taken in conjunction with the accompanying drawings, a brief description of which follows.

DETAILED DESCRIPTION OF THE SPECIFIC EMBODIMENT

Figures 1, 2:
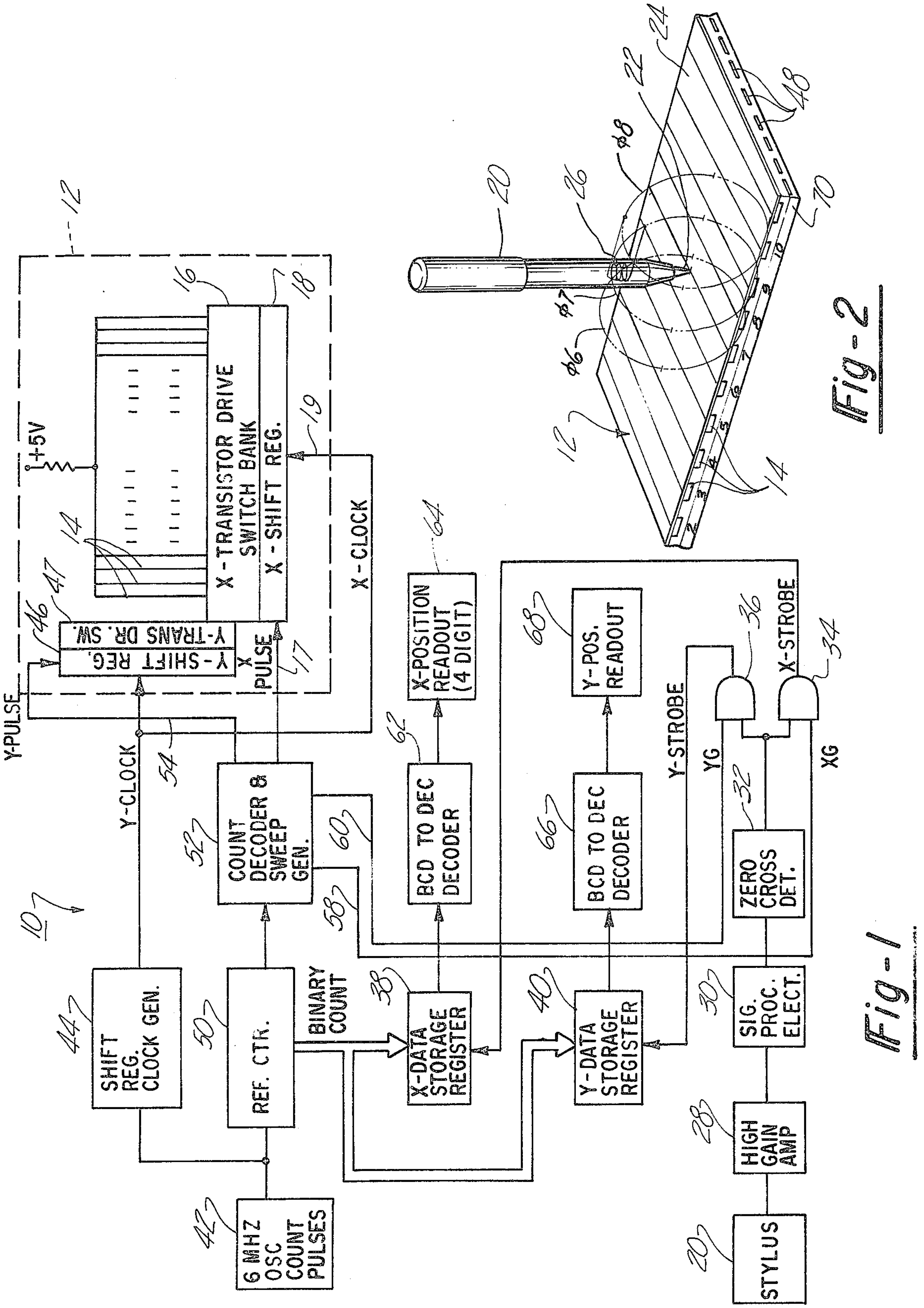
FIG. 1 is a block diagram of a stylus position measurement system embodying the present invention.
FIG. 2 is a cross sectional view in perspective of a tablet constructed in accordance with the invention, a stylus disposed at a certain position on the tablet, and an indication of the flux pattern for a single axis relative to the stylus pickup coil.

FIGS. 1 and 2 — General System Description

Referring to FIGS. 1 and 2, the present invention is shown embodied in a two-axis absolute digital position measurement system 10 comprising a tablet 12 and a free, pen-type stylus 20. The term "free" as used herein means hand-held and unconstrained by mechanical linkages. The tablet 12 is constructed as illustrated in FIG. 2 to provide a flat, rigid work surface 24 adapted to receive a work sheet such as a drawing or map. Tablet 12 comprises a portion of the position measurement electronics including a plurality of spaced parallel conductors 14 substantially coextensive with the work surface 24, the conductors being distributed or spaced along a horizontal axis in FIG. 1 also designated the X-axis. A similar set of conductors 48 define the Y-axis of measurement. A transistor drive switch bank 16 is provided for controlling the flow of excitation current through the conductors 14 in a sequence determined by a shift register 18. The rate of the energization pulse propagation sequence across the tablet 12 is established by the frequency of signals applied to the shift register 18 by way of a signal line 19. The shifts of the "X" pulse signal applied via line 17 through the shift register 18 operate switches in the transistor drive switch bank 16 to separately energize the conductors 14 from the 5 volt source indicated in FIG. 1.

Stylus 20 is of the hand-held, pen or pencil type, having a ball point position-determinant end 22 which is adapted to be placed on the work sheet and, hence, effectively on the work surface 24 of the tablet 21. Stylus 20 carries within the body thereof a pickup coil 26 the turns of which are in a plane which is orthogonal to the longitudinal axis of symmetry of the stylus 20. Thus, when the stylus 20 is in the untilted position of FIG. 2, the plane of the coil 26 is parallel to the plane of the work surface 24. It can be seen that the coil 26 is linked by the flux patterns produced by current flowing through the conductors 14. Changes in the flux linking coil 26 produce voltages which are used to indicate the position of the stylus end 22 within each of the parallel conductor systems. By providing pulse energization of each conductor 14, for example, it is apparent that voltage impulses are induced in the coil 26, the amplitude and polarity of such impulses being a function of (1) the distance between the position-determinant end 22 and the conductor 14 which is energized and (2) the direction from the end 22 to the energized conductor; i.e., assuming an unidirectional energization current flow, the flux pattern to the left of the end 22, as shown in FIG. 2, produces a voltage of one polarity while the flux pattern to the right of the end 22, as shown in FIG. 2, produces a voltage of the opposite polarity.

The output signal voltages from coil 26 of stylus 20 are connected as shown in FIG. 1 through a high-gain amplifier 28 to produce a more usable voltage level to a signal processing unit 30. In the preferred form, unit 30 is an active filter which produces a signal which represents the amplitude envelope of the sequence of impulses produced by the voltage pickup coil 26 in the stylus 20. The output from the signal processing unit 30 is connected to a zero crossing detector 32 which produces an output signal whenever the representative signal from unit 30 passes through a predetermined amplitude condition such as zero amplitude, or some other fixed value which represents a threshold or triggering value. The output signal from detector 32 is connected through alternately enabled gates 34 and 36 for application as a strobe signal to the X and Y position storage registers 38 and 40, respectively. As will be hereinafter described in greater detail, the position measuring system 10 provides two coordinate axes X and Y, the measurement operations being carried out in rapid and alternate succession between the two axes in a multiplexed fashion. Accordingly, gates 34 and 36 are alternately enabled during intervals when the X and Y conductors are alternately excited.

Describing now the digital signal generation apparatus, the following signal quantities are of principal importance in understanding the operation of the subject device:

a. Sweep Signal — a periodic signal quantity applied to the input of the shift register associated with the transistor drive switch bank of each axis, each sweep pulse initiating a cycle of conductor excitation for its associated axis.

b. Clock Signal — a periodic signal occurring between sweep signals, the number of clock signals occurring during any sweep signal interval being equal to the number of conductors which are energized.

c. Count Pulse — a high-frequency periodic signal occurring during clock pulse intervals at a rate which is much greater than the clock signal rate so as to produce high position measurement resolution; the number of count pulses having occurred between a sweep signal and a strobe signal being a direct digital indication of the absolute position of the stylus on the tablet.

d. Strobe Signal — the signal generated by the stylus pickup including the coil and associated electronics whenever the impulse wave passes under the stylus end and used as a timing mark to copy the pulse count in reference counter 50 into the data storage register which is active at that time.

In FIG. 1 the source of the sweep, clock, and count pulse signals includes a 6MHz clock oscillator 42 which may be of the crystal stabilized type. The signal from oscillator 42 is connected to a clock signal generator 44 which produces a 240 KHz clock signal output which is applied to the shift input of the shift register 18 of the X-axis and to the shift register 46 of the Y-axis. A separate switch bank 47 controls the excitation of the Y-axis conductors 48 according to shift times in Y-axis shift register 46. Note that the actual Y-axis conductors are shown only in FIG. 2 to avoid confusion in the drawings. The output of clock oscillator 42 is also connected into a reference counter 50 which produces a 3 KHz output signal. This signal is applied to a count decoder and sweep signal generator unit 52 which generates two 1.5 KHz sweep signals 180° out of phase with each other. Each sweep signal consists of a narrow pulse (4.2 microseconds) synchronized with the reference counter 50. The output line 17 carries the 1.5 KHz X-axis sweep signal to the X-axis shift register 18, and the output line 54 carries the phase shifted 1.5 KHz Y-axis sweep signal to the Y-axis shift register 46. It will be noted that the Y-axis shift register 46 operates in conjunction with a Y-axis transistor drive switch bank 47 which is, for all practical purposes, identical to the X-axis transistor drive switch bank 16. Decoder unit 52 also produces X and Y gating signals on lines 58 and 60, respectively, these signals being applied to the gates 34 and 36 as enabling signals for the X and Y strobe signal outputs, as previously described. Assuming conductors 14 are 80 in number per axis for the sake of illustration, it can be seen that the 3,000 Hz sweep signal rate for each axis and the 240 KHz clock signal rate results in a complete sweep of conductor excitation for each axis in only one half of the sweep period. For the second half of the X-axis sweep period, for example, no X-axis conductors are excited, but rather, the Y-axis sweep takes place. Thus, the X–Y axis multiplexing is carried out such that each axis position measurement function is assigned its own time period.

The reference counter 50 receives count pulses at a much higher rate than the frequency of occurrence of the sweep and clock signals. Accordingly, the count in reference counter 50 changes much more rapidly than the successive energizations of conductors 14. The count in counter 50 is transferred to the appropriate X or Y date storage register only upon the occurrence of a strobe signal, such strobe signal acting as a gating function to enable the transfer. The number of count pulses between any two adjacent clock pulses is exactly 25 in the present example and, thus, the resolution of the system is one twenty-fifth of the distance between adjacent conductors 14. Since such conductors 14 may be placed very close together, it is apparent that the resolution of the subject system 10 is extremely high; in an actual system, a resolution of 10 mils has been achieved.

The output of the X-axis date storage register 38 is connected to a BCD-to-decimal decoder 62 which drives a display unit 64 having Nixie-type readout tubes, as well known to those skilled in the art. Y-axis storage register 40 drives a BCD-to-decimal decoder 66 which in turn drives the Y-position display or readout unit 68. Although not shown in FIG. 1, it is apparent that the output of the registers 38 and 40 may, through proper interfacing, also be transferred into the memory of a computer unit for automatic storage of the digital position signals which are generated by the system 10.

Looking specifically to FIG. 2, it can be seen that the tablet 12 comprises a flat, planar, two-dimensional support surface 24 which may be made up of an epoxy resin fiberglass material having conductors 14 printed or otherwise bonded to the undersurface thereof. Y-axis conductors 48 are insulatively spaced from the conductors 14 but all of the thicknesses in the assembly of FIG. 2 are so slight as to make both conductors 14 and 48 substantially coplanar with the work surface 24. The entire arrangement is preferably stiffened by means of a proper backing material 70 which is also of a dielectric character so as to produce electrical insulation. The surface 14 is preferably marked with suitable indicia to delineate a useable area within which all position measurements are to be made.

Figure 3:
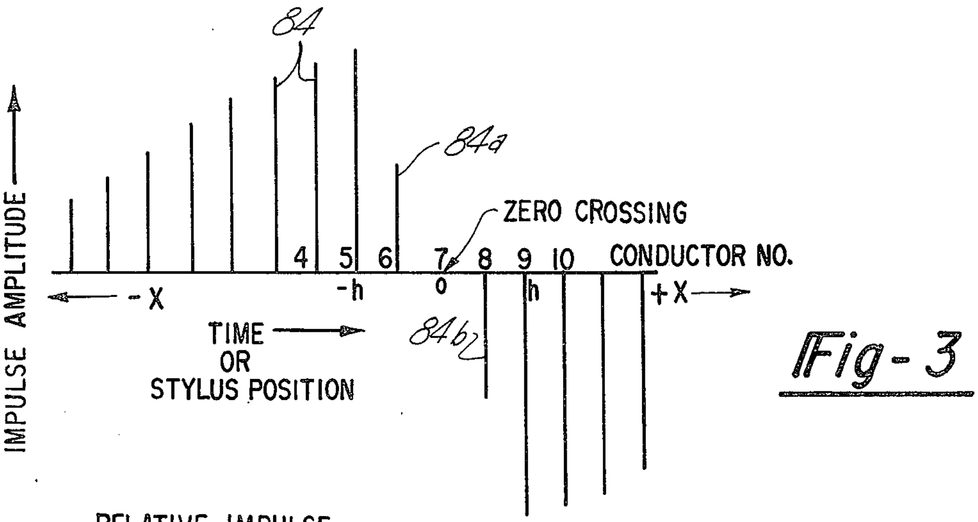
FIG. 3 is a waveform diagram showing the pattern of pickup signal amplitudes and polarities resulting from a pulse-type excitation of the tablet conductors.

FIG. 3 — Impulse Waveform

Looking now to FIG. 3, a sequence of voltage spikes or impulses 84 are shown to have a fixed time distribution along the horizontal axis of FIG. 3. These impulses 84 represent the voltage quantities which are induced in the coil 26 of the stylus 20 as it is held in a fixed position on the tablet 12 during the sweep of the excitation pulse across the conductors 14 of the tablet. Accordingly, pulses 84 occur at the 240 KHz clock rate. Looking to FIGS. 2 and 3 simultaneously, it is shown in FIG. 2 that the end 22 of the stylus 20 is placed directly over X-axis conductor No. 7, this particular conductor being arbitrarily selected for purposes of discussion only. It can be seen that the flux pattern of all conductors to the left of the point 22 in FIG. 2 produce positive impulse voltages in coil 26; the amplitude of the induced voltage being, for all practical purposes, a function of the distance between the end 22 and the excited conductor 14. From mathematical derivation, it can be shown that the amplitude ($e$) and polarity of the impulse voltage from each grid wire 14 at a distance X from the stylus end point 22 is represented by the equation:

$$e = -K \frac{X \cos \phi}{X^2 - 2h\,X \sin \phi + h^2} \qquad (1)$$

Where $$K = \frac{u\,NA}{2\pi} \left(\frac{di}{dt}\right) \qquad (2)$$

$u$ = permeability of the medium (air)
$N$ = number of coil turns
$A$ = area of coil 26
di/dt = time rate of change of grid wire current
$\phi$ = angle of stylus axis tilt from vertical in plane perpendicular to wires 14
$h$ = distance along stylus axis between centroid of coil and plane of grid wires.

Clearly, at X = 0, the voltage amplitude ($e$) is zero. Accordingly, the amplitude of the induced voltage impulses 84 grows steadily higher as the conductors 14 are energized in sequence until the first conductor located within the distance $h$ of the tip 22 is energized. By differentiating equation 1 with respect to X and setting it equal to zero, the maximum positive and negative envelope values will be found to occur at $X = +h$. At this time, the close proximity of that conductor to the coil 26 results in a reduction in amplitude but the impulse 84$a$ is still positive in polarity. Again, it is to be understood that polarity designations "positive" and "negative" are arbitrarily selected, since there is no fixed reference to positive and negative in the system as represented in FIGS. 2 and 3. The excitation of conductor No. 7 in the arrangement of FIG. 2 produces zero net effect on the coil 26; i.e., there is no signal induced in coil 26 when the conductor immediately under the coil is energized. This is because the plane of the coil 26 is tangent to the flux pattern around conductor No. 7 and no flux links the coil. Moreover, it will be immediately apparent that since the flux pattern produced around any given conductor 14 is essentially cylindrical in nature, the tilt or angular relationship between the stylus 20 and conductor No. 7 is of no consequence in flux coupling the coil whatsoever as long as end 22 remains at or very near the center of the cylinder of flux. This is a very significant factor in the insensitivity of the system 10 to stylus tilt, as will be hereinafter described in greater detail with specific reference to FIGS. 4, 5, and 7. Upon energization of conductor No. 8 in FIG. 2, the polarity of the impulse voltages induced in coil 26 goes negative and the amplitude increases for the energization of conductors within $h$ of the top and then falls off as the distance between the energized conductor 14 and the end 22 increases beyond $h$. Note that the timing or pulse interval of the impulses 84 in FIG. 3 is constant and inversely equal to the rate of occurrence of the clock signal, as previously described.

Midway between the last positive impulse 84$a$ and the first negative impulse 84$b$, there exists a zero amplitude crossing which represents the true passage of the impulse waveform through the point of the end 22 of stylus 20 on the tablet 12 and corresponds to the impulse voltage resulting from conductor No. 7 in the example illustrated in FIG. 2. In accordance with the invention, the 6 MHz count pulses are applied to the counter 50 beginning with the occurrence of the sweep signal so that an increase of twenty-five counts occurs between each of the 240 KHz clock signals; i.e., between the energization of successive conductors 14. Accordingly, it remains only to sample and transfer the contents of reference counter 50 into register 38 upon the occurrence of the zero amplitude crossing between impulses 84$a$ and 84$b$ to determine the position of the end point 22 of stylus 20 on the tablet 12 with reference to the X-axis. A similar sampling of reference counter 50 into Y-axis register 40 occurs during the second half of the X–Y multiplex cycle. The specific circuitry for generating the zero crossing signal is indicated as part of blocks 30 and 32 in FIG. 1 and preferred implementations are further described with reference to FIGS. 5 and 7.

Figure 4:
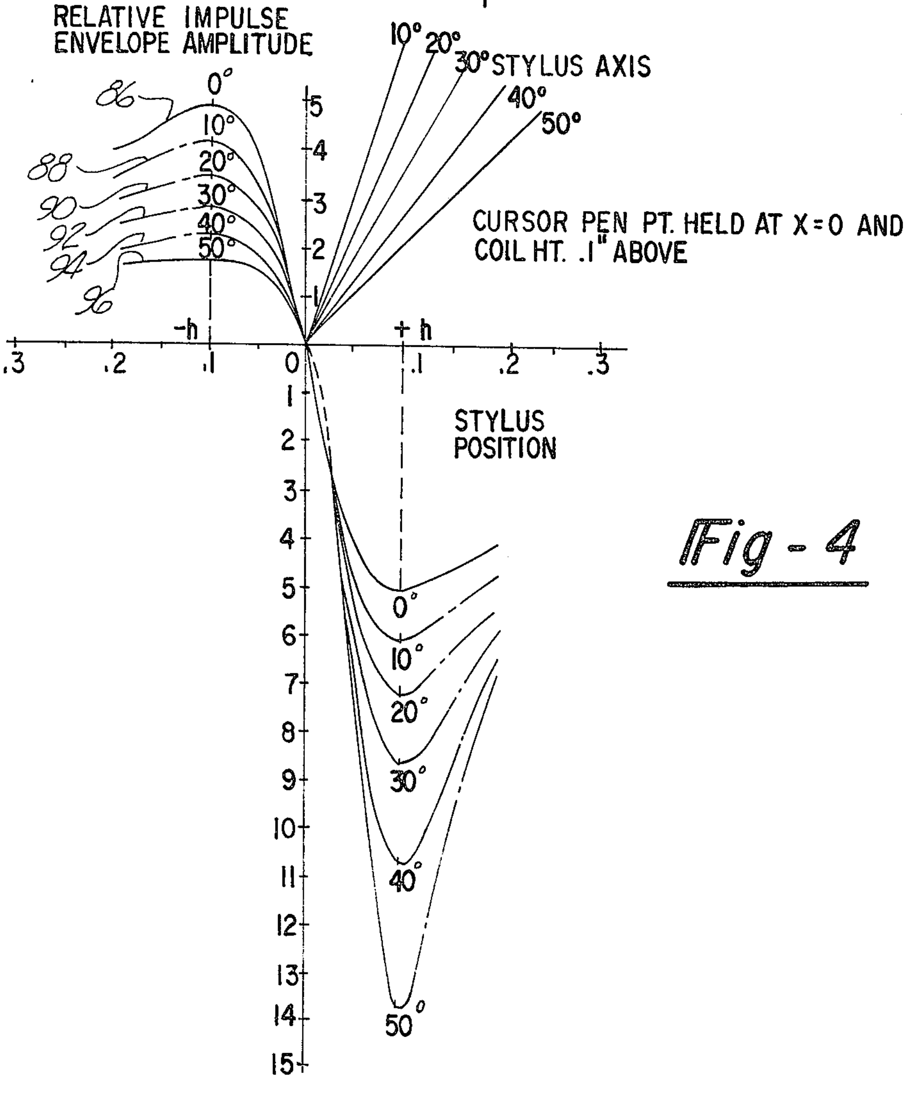
FIG. 4 is a waveform diagram indicating the effect of stylus tilt on the output signal envelope.

FIG. 4 — Impulse Envelope — Effect Of Stylus Tilt

It is to be understood that the excitation signals applied to the conductors 14 are pulses. Thus, the voltage induced in the coil 26 of stylus 20 is an impulse of the type shown at 84 in FIG. 3. As the number of conductors increases for a given tablet and, thus, the spacing between conductors decreases, the impulse amplitudes clearly define an envelope or waveform of the type shown at 86 in FIG. 4; i.e., the 240 KHz clock rate results in impulse intervals of only 4.2 microsecs. This waveform 86 is symmetrical about the zero crossing point whenever the stylus is held in the orthogonal position; i.e., straight up with reference to the surface 24. As the stylus is tilted by angular displacement about the end 22 in a plane of orthogonal to the conductors, it is apparent that the plane of the coil 26 simply rotates within the flux pattern cylinder of the conductor that would exist directly under end 22 and at all times remains tangent thereto at the radius determined by the distance between the end 22 and the coil 26. Accordingly, the zero crossing point is substantially unchanged over a large tilt angle, both positive and negative, and, as shown in FIG. 4, the only effect of tilt is to decrease the effective signal amplitude of one polarity while correspondingly increasing the effective signal amplitude of the other polarity. FIG. 4 shows envelopes 88, 90, 92, 94, and 96 for varying degrees of tilt angles in an actual system.

From the description relative to FIGS. 2, 3, and 4, it is apparent that uncompensated insensitivity to stylus tilt requires that the actual distance between the end 22 of stylus 20 and the plane of the grid conductors must be kept very small. The thickness of the finished layer of surface 24 as well as the thickness of the insulative layer between conductors 14 and 48 is preferably kept small compared to the desired system accuracy.

It is also apparent from FIG. 4 that the generation of a stylus output signal which accurately approximates the impulse envelope requires that a sufficient number of impulses be received on each side of the zero cross point. It is also apparent from FIG. 2 that for stylus positions near the edges of the grid pattern, the number of conductors on one side of the stylus from which to receive flux impulses becomes very small. Thus, it is desirable to make the useable area smaller than the grid pattern so approximately ten or twelve conductors lie outside the useable area borders on all sides. This reduces signal deformation known as "edge effect" and contributes to overall system accuracy.

Figures 5, 7:
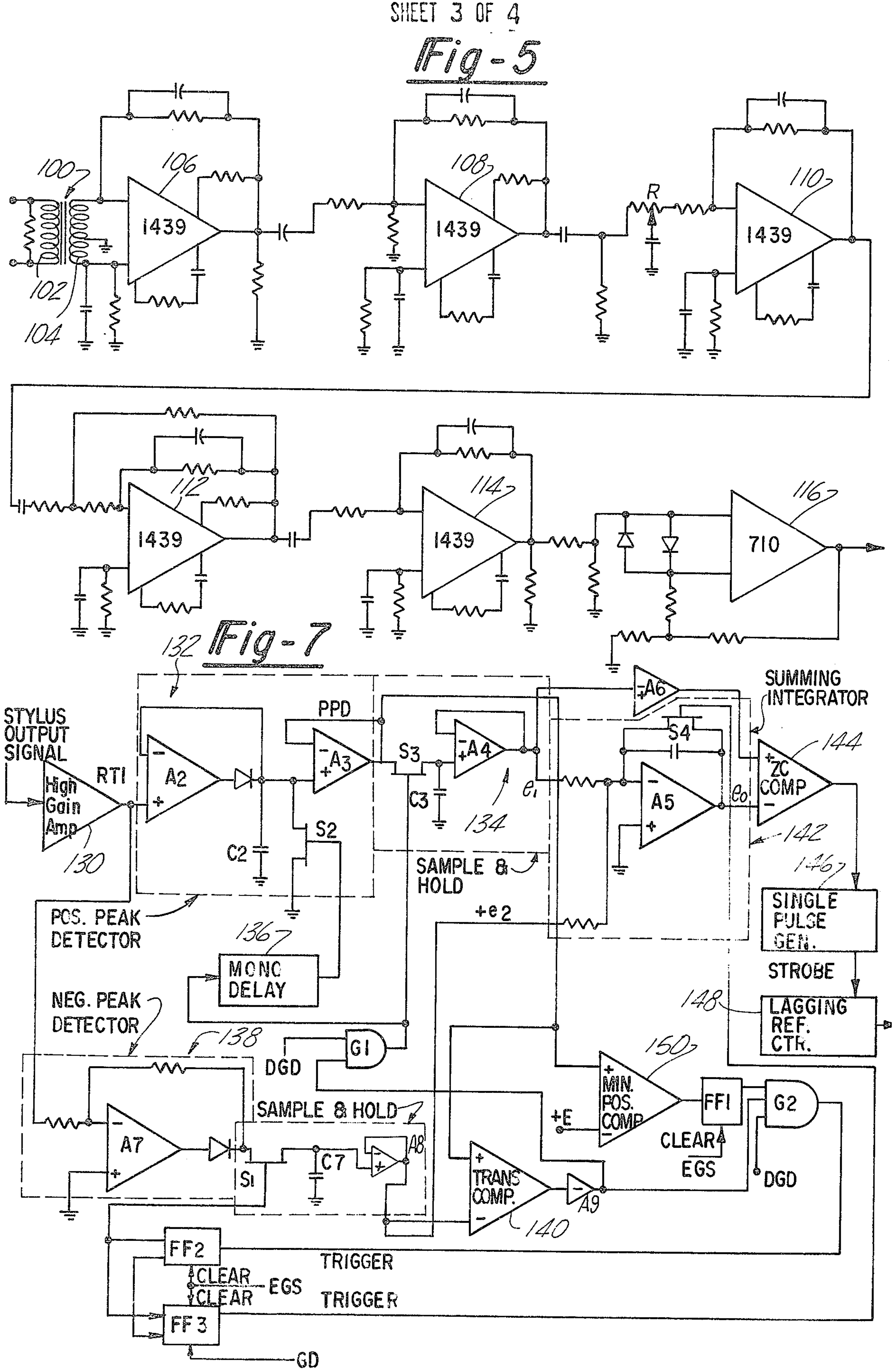
FIG. 5 is a schematic diagram of one form of signal forming or processing circuit usable in the system diagram of FIG. 1.
FIG. 7 is a schematic circuit diagram of an alternative signal forming or processing circuit usable in the system block diagram of FIG. 1; and, FIG. 8 is a waveform and timing diagram useful in describing the operation of the circuit of FIG. 7.
Figure 6:
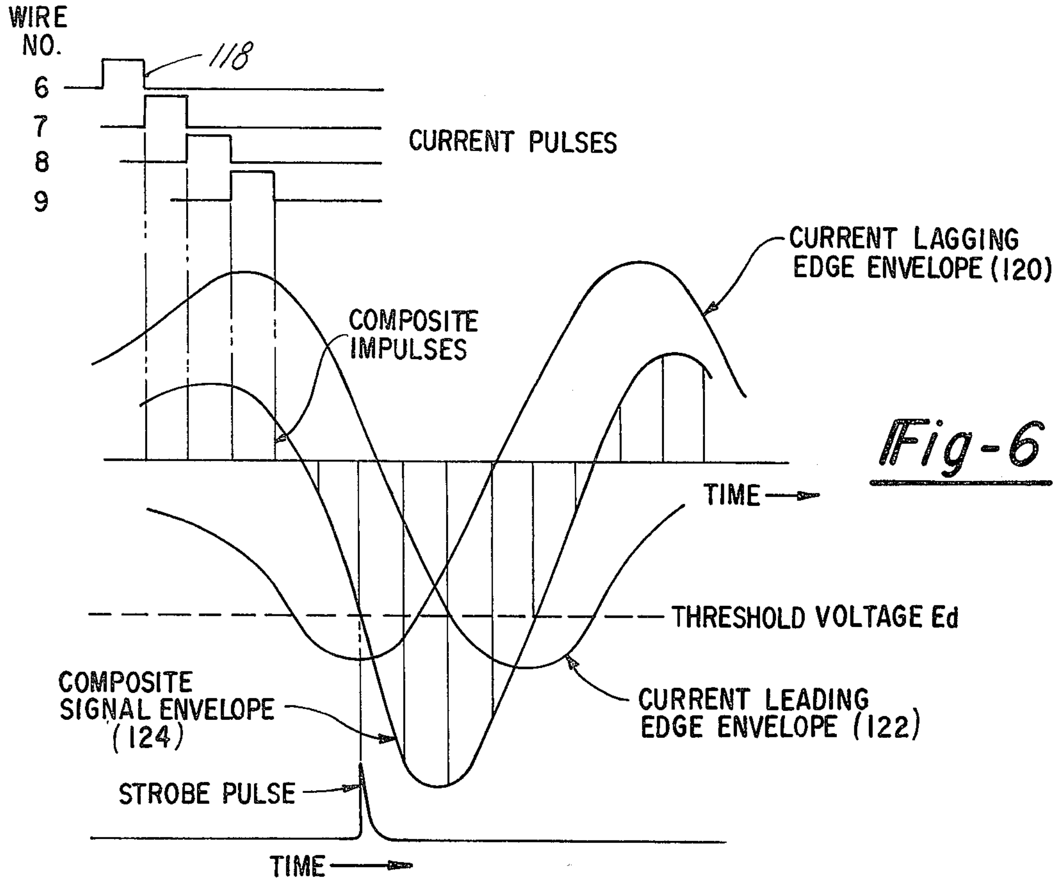
FIG. 6 is a timing diagram useful in describing the operation of the circuit of FIG. 5.

FIGS. 5 and 6 — Signal Processing — Envelope Embodiment

FIG. 5 is a schematic circuit diagram of a preferred embodiment of the signal processing electronics unit 30 in FIG. 1. The purpose of this circuit is to respond to the impulse voltage train which is produced in the coil 26 of the stylus 20 upon application of the pulse sequence represented in FIG. 6 to the parallel spaced X-axis conductors 14. As is apparent from the circuit diagram of FIG. 5, the circuitry comprises a voltage step-up transformer 100 having a primary coil 102 which is connected across the stylus pickup coil 26 and a center tapped secondary winding 104 which is connected to the opposite inputs of a type 1439 operational amplifier 106. Amplifier 106 is the first in a series of five type 1439 operational amplifiers including amplifiers 108, 110, 112, and 114 which together function in the manner of a band-pass filter to receive the voltage impulses and to recreate the envelope of the impulse train. Resistor R may be varied to achieve a fine adjustment in the zero coordinate position on the tablet. Amplifier 114 is connected to an amplitude comparator 116 which represents the zero crossing detector 32 in the circuit of FIG. 1.

In considering the operation of the circuit of FIG. 5 in combination with the waveforms and timing indications of FIG. 6, it must be remembered that the signal of interest is the analog envelope of the real time impulse voltage train generated in coil 26 of the stylus 20. If the clock signal frequency (240 KHz) is greater than twice the bandwidth of the analog signal envelope, a low-pass filter with a bandwidth less than 120 KHz can extract the frequency spectrum of the envelope and accurately recreate the analog signal. This is the approach implemented in the circuit of FIG. 5 and is known as sampled-data signal reconstruction by those skilled in the art.

To produce a single impulse for each grid drive pulse; i.e., to ensure that no system response is generated to trailing edges of the drive pulses, the grid drive pulses 118 illustrated in FIG. 6 are made equal in time span to the interval between the excitation of adjacent conductors 14. Thus, the trailing edge of the excitation 118 for conductor No. 6 corresponds exactly in time to the leading edge of the excitation pulse for conductor No. 7 as is clearly indicated in FIG. 6. In other words, when the current in one of the conductors 14 is turned on, the current in the lagging or just preceding conductor 14 is turned off. This gives rise to two identical but time shifted and amplitude inverted impulse envelopes 120 and 122 illustrated in FIG. 6. Envelope 120 represents the current lagging edge while envelope 122 represents the current leading edge. This time shift is equal to the clock signal period or 4.2 microseconds. Since the net voltage induced in the pickup coil 26 is the algebraic sum of the impulses of envelopes 120 and 122, it can be seen that the resulting composite envelope is as shown at 124 in FIG. 6. It should be noted that the composite envelope 124 is actually made up of the composite impulses having the 4.2 microsecond time spacing previously mentioned. It is also apparent that the composite envelope 124 has two zero amplitude conditions or zero crossing and either of these can be used theoretically to identify stylus position. As a practical matter, however, to account for the large finite grid wire spacing and the vertical space between the grid wire plane and surface 24, it is preferred to employ a delayed representation of the first zero crossing, this being accomplished by establishing a negative threshold value $E_d$ and detecting the passage of the composite envelope 124 through this threshold value. The result is the generation of a strobe pulse 126 precisely as the composite waveform 124 passes through the threshold level minus $E_d$ as represented in FIG. 6. The strobe pulse is applied to the registers 38 and 40 as previously described with reference to FIG. 1 to gate in the count from the reference counter 50. The counter 50 automatically resets itself to zero count at the end of each sweep.

It will be appreciated that the analog signal envelope can be described by a limited band of frequencies centered about zero. As long as the clock signal frequency of 240 KHz is greater than twice the bandwidth of the analog signal envelope (about 75 kHz), the analog signal can be faithfully reconstructed by the filter of FIG. 5.

Figure 8:
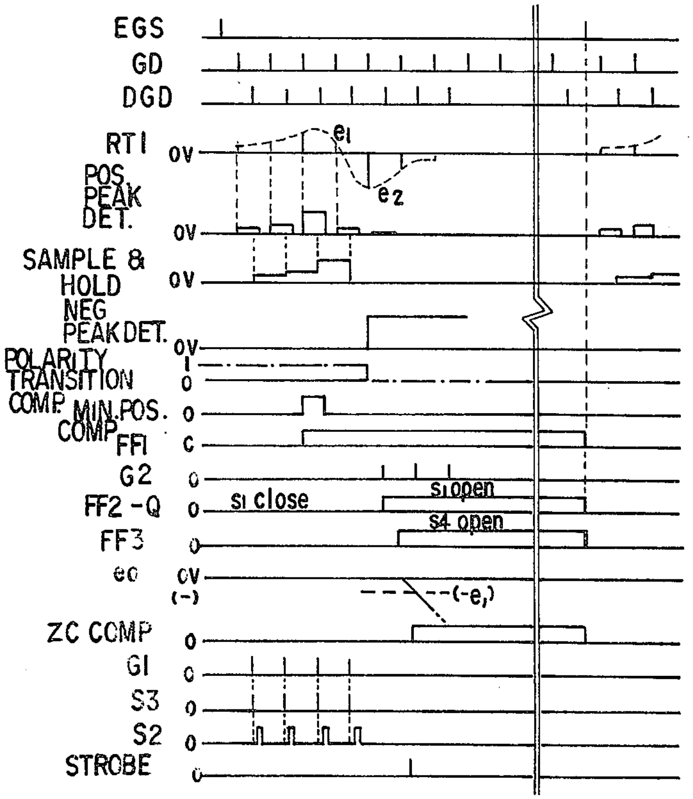

FIGS. 7 and 8 — Signal Processing-Impulse Embodiment

Looking now to FIGS. 7 and 8, a second embodiment or implementation of the signal processing electronics identified as block 30 in FIG. 1 will be described. FIG. 7 is the schematic diagram of the alternative circuitry and FIG. 8 is a signal waveform and timing diagram which is useful in explaining the operation of the circuit of FIG. 7. This signal processing approach is applicable either with the type of envelope waveform in FIG. 4 or 124 in FIG. 6. The four basic timing and synchronizing signals which are generated and employed in the circuit of FIG. 7 are as follows:

1. EGS — The "end of grid sweep" signal, a pulse generated at the completion of each grid drive sweep to initialize the flip-flop memory blocks;
2. GD — A grid drive signal pulse train in which each pulse is sufficiently short in time to produce one impulse voltage spike for each grid current drive pulse; this is basically equivalent to the "clock" signal of FIG. 1;
3. DGD — The delayed grid drive signal, a replica of GD except phase shifted by 180°; and,
4. CLOCK — A basic 6 MHz squarewave signal unit as a synchronizing reference and establishing position resolution; this is equivalent to the "count" signal of FIG. 1.

Describing the circuit of FIG. 7 with reference to the timing diagram of FIG. polarity the stylus coil 26 produces signals which are applied to the amplifier 130 to give the amplified real time impulses RTI. The real time impulses RTI are fed to the positive peak detector 132 which holds the amplitude of each positive impulse over a given time interval. The DGD pulses turn on the sample and hold switch S3 which stores the impulse voltage on capacitor C3. A short time interval after DGD, switch S2 resets the peak detector to zero. This allows the detector to follow the impulse envelope waveform. Amplifiers A3 and A4 are buffer amplifiers. The drive signal for switch S2 is generated by the delayed monostable unit 136. The RTI goes negative, the positive peak detector output goes to zero. The first negative impulse, referred to as $e_2$, is sensed by the negative peak detector 138. Switch S1 is closed during this time. The polarith transition comparator 140 immediately recognizes that the signal polarity at its differential input has been reversed. The output of comparator 140 is used for two purposes: (1) to enable gate G1 allowing switch S3 to transfer all positive peak detector voltages up to and including the last positive impulse voltage referred to as $e_1$, onto capacitor C3 and (2) to enable gate G2 allowing flip-flop FF2 to be set by DGD and opening switch S1 thus holding the first negative impulse $e_2$ on capacitor C7. At this time, the last positive impulse has been converted to a dc voltage equal to $e_1$ and the first negative impulse has been converted to a dc voltage equal to $e_2$. Both signals are fed to the input of the summing integrator 142. At the next GD pulse, FF3 is clocked to open switch S4. The output $e_o$ of the integrator 142 begins to ramp downward at a slope determined by the sum of $e_1$ and $e_2$. Proper selection of a constant scale factor applied to the slope will allow $e_o$ to reach minus $e_1$ at the desired time $t_o$. At this point the zero cross comparator 144 changes output state. This change is converted to a single pulse and used to strobe a lagging reference counter 148. This counter follows the reference counter 50 on a count-to-count basis but lags in absolute count by two grid wire intervals to make up for the lag due to signal processing. The function of the minimum position comparator 150 is to provide noise immunity to the signal process. Purpose (2) above of comparator 140 cannot occur unless the positive impulse voltages have achieved a minimum threshold value *E*. In a given grid wire drive sweep, after the last wire has been pulsed or excited, the EGS signal resets FF1, FF2, and FF3.

It is to be understood that the foregoing description is made with reference to illustrative embodiments of the invention and is not to be construed in a limiting sense as various modifications in circuitry and physical design may be apparent to those skilled in the art. Moreover, it is to be understood that the system described herein functions in accordance with the invention irrespective of whether the stylus is tilted exclusively inthe plane normal to the grid wires. The mathematical equation (1) is derived on this premise; however, the stylus can be tilted in any spatial attitude and the resultant impulse voltage envelope will still exhibit a zero-cross point in the waveform and this zero-cross will still correspond to the grid position directly at the stylus tip.

The embodiments of the invention in which an exclusive property or privilege is claimed are defined as follows:

1. Apparatus for producing data defining the position of a stylus on a two-dimensional reference surface comprising: means defining a reference surface for receiving a work sheet, a plurality of spaced parallel conductors substantially coextensive with said surface, switch means electrically connected to said conductors and responsive to first signals for individually applying pulses of electrical energy to said conductors in sequence to produce a pulse wave which transulates uniformly across said surface along an axis perpendicular to said conductors, clock means for producing count pulses at a predetermined frequency and sweep signals at a frequency which is a fraction of said predetermined frequency, register means connected to receive said count pulses and for storing a representation of the number of pulses occurring subsequent to initiation of each sweep signal; a stylus having position-determinant end freely positionable on said surface, pickup means including a portion carried in said stylus and inductively responsive to the pulses in said conductors for producing an output voltage, said output voltage being the analog envelope of the real time pulse voltage train generated in said portion by said pulses and being representative of the time of passage of said pulse wave at the position of the end of the stylus on the surface, and means connecting the output voltage from the stylus to the register means for reading the pulse count at the time said analog envelope passes through a preselected reference amplitude.

2. Apparatus as defined in claim 1 wherein the stylus comprises a body adapted to be hand-held, said pickup means comprising an inductive coil disposed in said body, the plane of the coil being substantially normal to the longitudinal axis of the body.

3. Apparatus as defined in claim 1 wherein said register means includes a digital counter having a plurality of stages connected in sequence for representing respective digits of the pulse count.

4. Apparatus as defined in claim 3 wherein the stages of the counter are constructed to provide decimal count representations.

5. Apparatus as defined in claim 1 wherein said fraction is such that the number of pulse counts occurring in a given time interval is substantially greater than the number of clock signals occurring in the same interval.

6. Apparatus as defined in claim 1 wherein the switch means applies said pulses unidirectionally to said conductors to produce a uniform but time-varying field orientation across the surface.

7. Apparatus as defined in claim 6 wherein the stylus comprises a body having a longitudinal axis, the pickup means includes an inductive coil carried by the stylus normal to the longitudinal axis and responsive to flux changes produced by the unidirectional energization of the conductors to produce a waveform which reverses in polarity as the pulse wave passes the end of the stylus, said pickup means further comprising signal forming means for producing said output signal at a time which is related to the time at which said voltage pulses reverse in polarity.

8. Apparatus as defined in claim 1 comprising a second plurality of spaced parallel conductors substantially coextensive with said surface but oriented at right angles to the first plurality of conductors, second register means connected to receive said timing signals, and multiplexing means for alternately energizing the first and second pluralities of conductors and, in synchronism therewith, connecting the stylus output to the first and second register means to determine the stylus end position with respect to each of two perpendicular axes.

9. Apparatus as defined in claim 7 wherein the duration of the pulses applied to the conductors is equal to the interval between pulses, the signal forming means including means for producing a substantially continuous analog representation of the envelope of the voltage pulses produced in said coil, and means for detecting the point in time where said analog representation achieves a predetermined amplitude level relative to a reference level.

10. Apparatus as defined in claim 7 wherein the signal forming means comprises first sampling means for producing a signal representing the amplitude of the last coil voltage pulse of one polarity during a sweep signal interval, second sampling means for producing a signal representing the amplitude of the first coil voltage pulse of the opposite polarity during the same clock signal interval, and means connected to receive the resulting signals for producing said output signal as a function of the difference between the first and second coil pulse amplitudes.

11. Apparatus for producing data defining the position of the pointer end of a stylus relative to a sequentially-energized planar conductor grid comprising: means defining a plurality of parallel, coplanar and closely spaced conductors, means for sequentially energizing the conductors with unidirectional current pulses at a first rate; a stylus having an end usable as a pointer, a coil disposed within the stylus perpendicular to the longitudinal axis thereof and defining a distance h between the conductor plane and the coil plane measured along the stylus axis, said coil being responsive to the flux pattern produced by the energization of the conductors to produce a voltage impulse series the envelope of which exhibits an amplitude which increases to a positive peak until the first conductor within a distance h on one side of the pointer end is energized, then decreases toward a negative peak coincident with the energization of a conductor a distance h from the pointer on the other side thereof, and means responsive to the coil voltage impulse envelope to indicate stylus end position on the conductor plane as a function of the time of said voltage envelope amplitude passing through a reference value between said positive and negative peaks.

12. Apparatus as defined in claim 11 wherein said means responsive to the coil voltage impulse envelope includes a count pulse generator producing pulses at a second rate which is substantially greater than the first rate, and means for determining the number of count pulses produced between the beginning of the conductor energization sequence and the passage of said envelope amplitude through said reference value.

13. Apparatus as defined in claim 12 wherein said reference value is zero.

14. Apparatus as defined in claim 12 wherein said reference value is a non-zero threshold voltage.

* * * * *